(12) United States Patent
Wang et al.

(10) Patent No.: US 12,340,730 B2
(45) Date of Patent: Jun. 24, 2025

(54) DISPLAY DEVICE AND OPERATION METHOD FOR DISPLAY DEVICE

(71) Applicant: Wistron Corporation, New Taipei (TW)

(72) Inventors: Wenzhi Wang, New Taipei (TW);
Jiasheng Chen, New Taipei (TW);
Yongqiang Li, New Taipei (TW);
Junxin Qiu, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 18/498,003

(22) Filed: Oct. 30, 2023

(65) Prior Publication Data

US 2025/0095538 A1 Mar. 20, 2025

(30) Foreign Application Priority Data

Sep. 19, 2023 (CN) .......................... 202311215400.X

(51) Int. Cl.
*G09G 3/20* (2006.01)
*G06F 3/14* (2006.01)

(52) U.S. Cl.
CPC ......... *G09G 3/2096* (2013.01); *G06F 3/1446* (2013.01); *G09G 2360/04* (2013.01); *G09G 2370/22* (2013.01)

(58) Field of Classification Search
CPC .................................................. G09G 2370/22
See application file for complete search history.

(56) References Cited

U.S. PATENT DOCUMENTS

| 7,334,054 | B2* | 2/2008 | Anderson | G09G 5/006 |
| | | | | 710/15 |
| 8,165,701 | B2* | 4/2012 | Aiso | H04H 60/04 |
| | | | | 709/224 |
| 10,467,981 | B1* | 11/2019 | Yoon | G06T 1/20 |
| 2005/0280640 | A1* | 12/2005 | Bonorden | G09G 5/006 |
| | | | | 345/204 |
| 2011/0162030 | A1* | 6/2011 | Doi | G02B 6/4469 |
| | | | | 725/127 |
| 2014/0250254 | A1* | 9/2014 | Lee | G06F 13/385 |
| | | | | 710/316 |

(Continued)

FOREIGN PATENT DOCUMENTS

| CN | 207833498 | 9/2018 |
| CN | 112256501 | 1/2021 |
| CN | 109766289 | 3/2022 |

*Primary Examiner* — William Boddie
*Assistant Examiner* — Bipin Gyawali
(74) *Attorney, Agent, or Firm* — JCIPRNET

(57) ABSTRACT

A display device includes an input port, an output port, a data port, a detection circuit, a processor, and a connection tips circuit. The detection circuit generates a first state value according to a connection state of the input port, and generates a second state value according to a connection state of the output port. The processor generates a third state value according to a connection state of the data port. The processor determines a connection between the display device and an audiovisual source and provides a connection tips signal according to the first state value, the second state value, and the third state value. The connection tips circuit controls the display device to display a connection tips image in response to the connection tips signal.

19 Claims, 10 Drawing Sheets

(56) References Cited

U.S. PATENT DOCUMENTS

| | | | |
|---|---|---|---|
| 2014/0362294 A1* | 12/2014 | Majid | H04N 21/4312 |
| | | | 348/564 |
| 2015/0067374 A1* | 3/2015 | Kim | G06F 13/385 |
| | | | 713/324 |
| 2020/0184921 A1* | 6/2020 | Yong | G06F 3/1423 |
| 2020/0220915 A1* | 7/2020 | Happes | H04L 65/403 |
| 2021/0263741 A1* | 8/2021 | Suh | G06F 9/3013 |
| 2023/0350501 A1* | 11/2023 | Yong | G06F 3/03543 |

\* cited by examiner

DISPLAY DEVICE AND OPERATION METHOD FOR DISPLAY DEVICE

CROSS-REFERENCE TO RELATED APPLICATION

This application claims the priority benefit of China application serial no. 202311215400.X, filed on Sep. 19, 2023. The entirety of the above-mentioned patent application is hereby incorporated by reference herein and made a part of this specification.

BACKGROUND

Technical Field

The disclosure relates to an electronic device and an operation method for an electronic device, specifically to a display device and an operation method for a display device.

Description of Related Art

As technologies evolve, display devices are applied in more and more scenarios, and multi-screen connection across multiple display devices enable a broad viewing angle, highly immersive experience, and multi-window display and processing. Multi-screen connection across multiple display devices has become an essential technique for multitasking operations in industries such as business, gaming, and film and television. However, different display devices have USB Type-C ports that are identical in appearance, which makes it difficult for a user to distinguish between them. As a result, connection errors may frequently occur. When a connection error occurs, the display device may only display an error screen such as a blue screen or a black screen. The user therefore has no choice but to keep exploring and trying different connection approaches until a correct connection is made between the display device and an audiovisual source device (such as a display device that provides audiovisual signals) and a normal display is realized. Hence, the above-mentioned connection between the display device and the audiovisual source device may destroy the user's experience. According to the above, how to provide a display system in which a connection state of a display device can be detected and a connection tips image can be provided according to the connection state is one of the research focuses of people skilled in the art.

SUMMARY

The disclosure provides a display device and an operation method for a display device, in which a connection state of the display device can be detected and a connection tips image can be provided according to the connection state.

A display device of the disclosure includes an input port, an output port, a data port, a detection circuit, a processor, and a connection tips circuit. The detection circuit is coupled to the input port and the output port. The detection circuit generates a first state value according to a connection state of the input port and generates a second state value according to a connection state of the output port. The processor is coupled to the data port and the detection circuit. The processor generates a third state value according to a connection state of the data port. The processor reads the first state value and the second state value. The processor determines a connection between the display device and an audiovisual source and provides a connection tips signal according to the first state value, the second state value, and the third state value. The connection tips circuit is coupled to the processor. The connection tips circuit controls the display device to display a connection tips image in response to the connection tips signal.

An operation method of the disclosure is for a display device. The display device includes an input port, an output port, a data port, and a detection circuit. The operation method includes the following. A first state value is generated by the detection circuit according to a connection state of the input port and a second state value is generated by the detection circuit according to a connection state of the output port. A connection between the display device and the audiovisual source is determined and a connection tips signal is provided according to the first state value, the second state value, and a third state value that corresponds to a connection state of the data port. The display device is controlled to display a connection tips image in response to the connection tips signal.

In light of the foregoing, the display device determines a result of the connection between the display device and the audiovisual source according to the first state value, the second state value, and the third state value, and displays the connection tips image accordingly. In this way, when a connection error occurs, the display device provides the connection tips image to guide the user in performing a correct connection.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
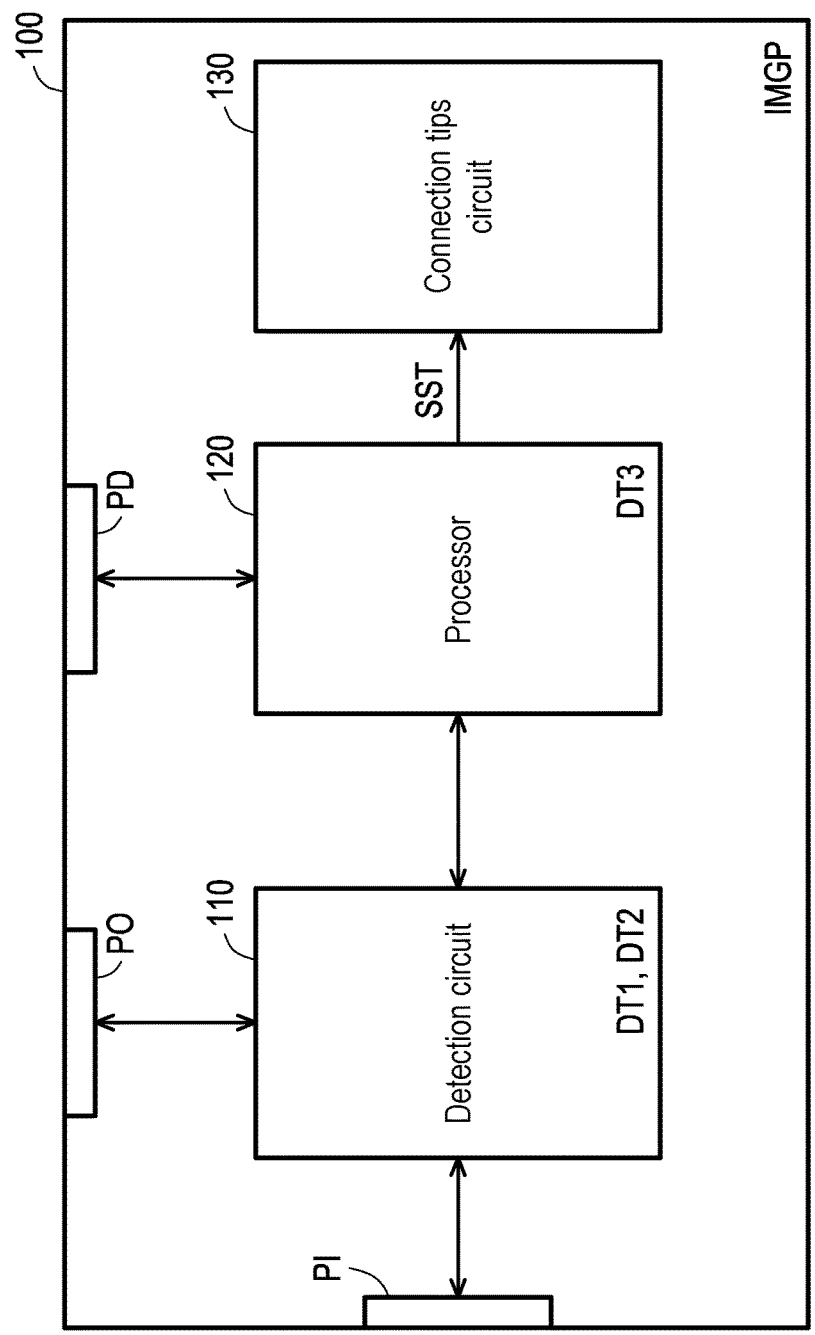
FIG. 1 is a schematic view illustrating a display device according to one embodiment of the disclosure.
Figure 1:
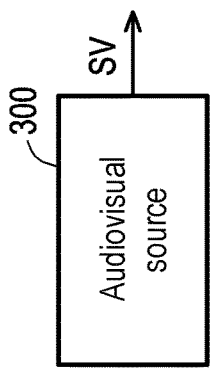

Below are elaborations on some embodiments of the disclosure duly illustrated in their relevant drawings. In the following description, identical reference numerals in different drawings denote identical or similar elements. The embodiments are merely part of the disclosure rather than disclosing all possible embodiments of the disclosure. More specifically, the embodiments are simply examples of the disclosure and do not limit the scope of the claims thereof.

Figure 2:
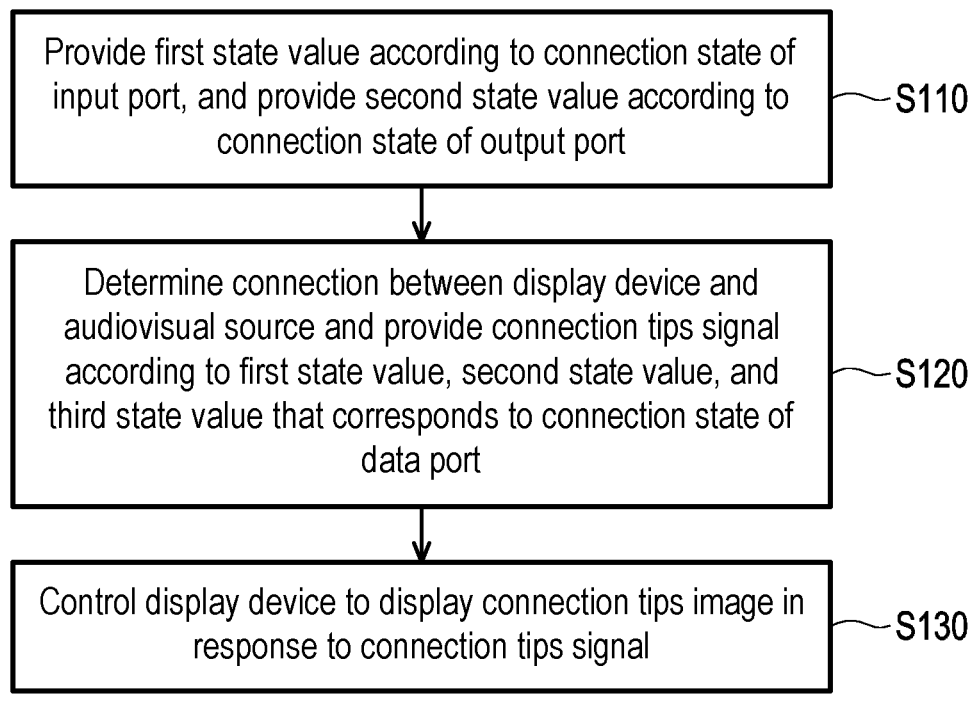
FIG. 2 is a schematic view illustrating an operation method according to one embodiment of the disclosure.

Referring to FIG. 1 and FIG. 2 together, FIG. 1 is a schematic view illustrating a display device according to one embodiment of the disclosure. FIG. 2 is a schematic view illustrating an operation method according to one embodiment of the disclosure. In this embodiment, a display device 100 includes an input port PI, an output port PO, a data port PD, a detection circuit 110, a processor 120, and a connection tips circuit 130. An operation method S100 is adapted for the display device 100. The operation method S100 includes steps S110 to S130. In this embodiment, the input port PI, the output port PO, and the data port PD are each a USB Type-C audiovisual port.

In this embodiment, the detection circuit 110 is coupled to the input port PI and the output port PO. In step S110, the detection circuit 110 generates a first state value DT1 according to a connection state of the input port PI and generates a second state value DT2 according to a connection state of the output port PO. In other words, the first state value DT1 corresponds to the connection state of the input port PI. The second state value DT2 corresponds to the connection state of the output port PO. In this embodiment, the first state value DT1 and the second state value DT2 can respectively represent connection state flag values, yet the disclosure is not limited thereto.

In this embodiment, the processor 120 is coupled to the data port PD and the detection circuit 110. The processor 120 generates a third state value DT3 according to a connection state of the data port PD. In other words, the third state value DT3 corresponds to the connection state of the data port PD. In step S120, the processor 120 reads the first state value DT1 and the second state value DT2 in the detection circuit 110. In step S120, the processor further determines a connection between the display device 100 and an audiovisual source 300 and provides a connection tips signal SST according to the first state value DT1, the second state value DT2, and the third state value DT3. The connection tips circuit 130 is coupled to the processor 120. In step S130, the connection tips circuit 130 controls the display device 100 to display a connection tips image IMGP in response to the connection tips signal SST. In this embodiment, the third state value DT3 may be a connection state flag value, yet the disclosure is not limited thereto.

The audiovisual source 300 may be a signal source device that provides an audiovisual signal SV. The audiovisual source 300 may be an electronic device of any type that provides the audiovisual signal SV.

It is worth mentioning that the display device 100 determines a result of the connection between the display device 100 and the audiovisual source 300 according to the first state value DT1, the second state value DT2, and the third state value DT3 and displays the connection tips image IMGP accordingly. Hence, when a connection error occurs, the display device 100 provides the connection tips image IMGP to guide the user in performing a correct connection.

For example, the input port PI and the output port PO are each a USB Type-C audiovisual port. The data port PD is a USB Type-C data transfer only port. The processor 120 determines whether the connection between the display device 100 and the audiovisual source 300 is incorrect according to the first state value DT1, the second state value DT2, and the third state value DT3. When the connection between the display device 100 and the audiovisual source 300 is determined to be incorrect, the processor 120 provides the connection tips signal SST that corresponds to the incorrect connection. The connection tips circuit 130 controls the display device 100 to display the connection tips image IMGP in response to the connection tips signal SST that corresponds to the incorrect connection. The user therefore is able to perform a correct connection according to the connection tips image IMGP.

In this embodiment, the connection tips image IMGP may be a pop-up tips image that pops up and displays how to correctly connect the audiovisual source 300 to the display device 100, yet the disclosure is not limited thereto. In this way, when a connection error occurs, the display device 100 is able to instantly display the connection tips image IMGP in a "pop-up" manner. The user therefore is able to view the connection tips image IMGP and correctly connect the audiovisual source 300 to the display device 100.

On the other hand, when the connection between the display device 100 and the audiovisual source 300 is determined to be correct, the processor 120 does not provide the connection tips signal SST. Hence, the connection tips image IMGP is not displayed. In some embodiments, when the connection between the display device 100 and the audiovisual source 300 is determined to be correct, the processor 120 provides the connection tips signal SST that corresponds to the correct connection. Therefore, the display device 100 outputs a tips image of correct connection.

In the case of a correct connection, the display device 100 receives the audiovisual signal SV provided by the audiovisual source 300 and operates according to the audiovisual signal SV.

The processor 120 may be a central processing unit (CPU) or other programmable general purpose or special purpose microprocessor, digital signal processor (DSP), programmable controller, application specific integrated circuit (ASIC), programmable logic device (PLD), other similar device or a combination thereof, and may load and execute a computer program.

Figure 3:
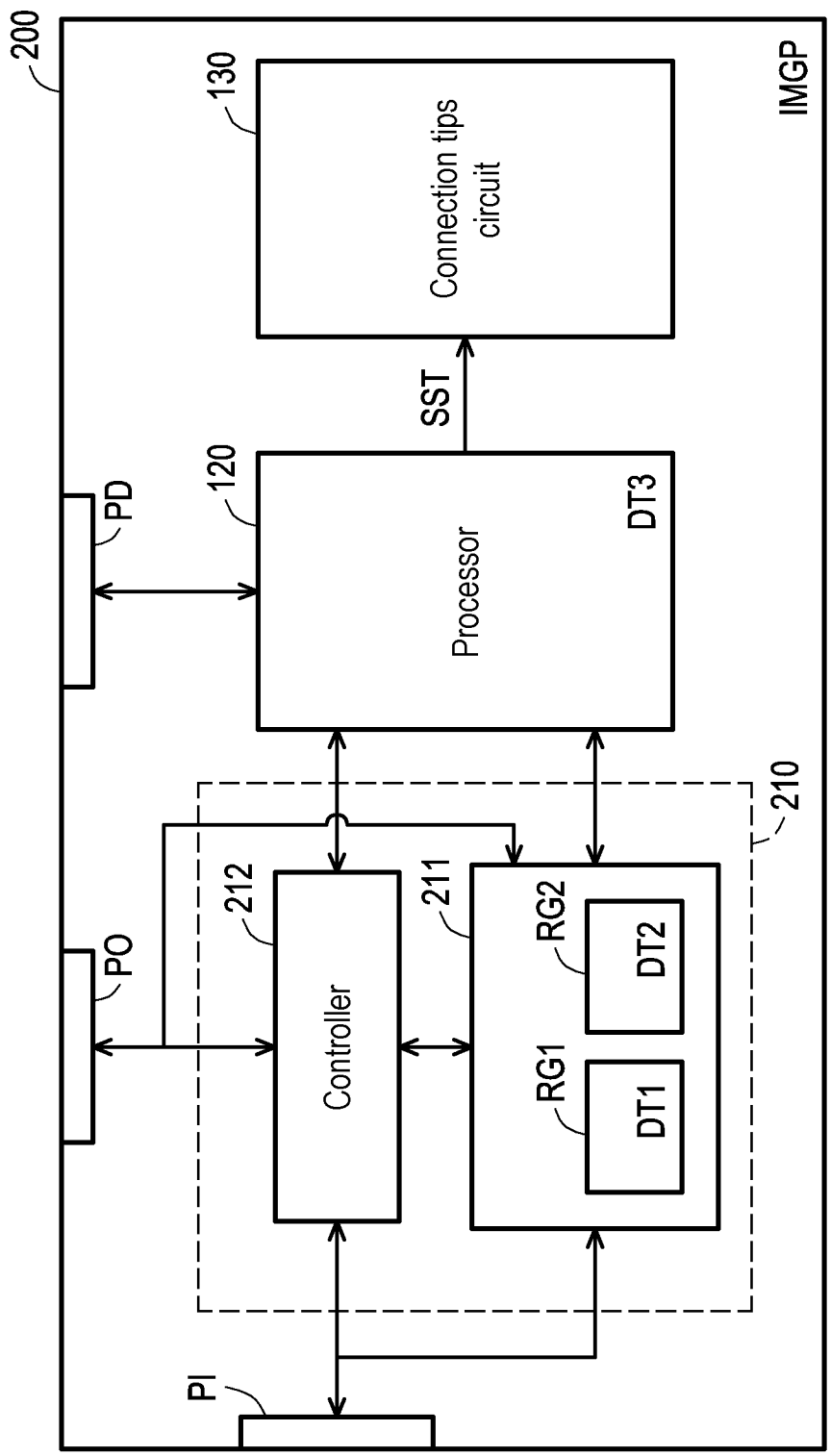
FIG. 3 is a schematic view illustrating a display device according to one embodiment of the disclosure.

Referring to FIG. 3, FIG. 3 is a schematic view illustrating a display device according to one embodiment of the disclosure. In this embodiment, a display device 200 includes the input port PI, the output port PO, the data port PD, a detection circuit 210, the processor 120, and the connection tips circuit 130. In this embodiment, the detection circuit 210 includes a controller 211 and a controller 212. The controller 211 is coupled to the input port PI, the output port PO, and the processor 120. The controller 211 generates the first state value DT1 according to the connection state of the input port PI and generates the second state value DT2 according to the connection state of the output port PO.

For example, in this embodiment, the controller 211 includes a register RG1 and a register RG2. The register RG1 stores the first state value DT1. The register RG2 stores the second state value DT2. The register RG1 and the register RG2 may be memory sections with different addresses in a memory element, or may be different memory elements.

In this embodiment, when the input port PI is not connected to an audiovisual source, the first state value DT1 is equal to a first value. The first value is, for example, "0". When the input port PI is connected to an audiovisual source, the first state value DT1 is equal to a second value. The second value is, for example, "1". When the output port PO does not receive the audiovisual source, the second state value DT2 is equal to the first value. When the output port PO receives the audiovisual source, the second state value DT2 is equal to the second value. For example, the controller 211 may set values of the first state value DT1 and the second state value DT2 using a setting circuit (not illustrated).

The controller 212 is coupled to the input port PI, the output port PO, the controller 211, and the processor 120. The controller 212 determines a transmission direction of an audiovisual signal, for example, the audiovisual signal SV illustrated in FIG. 1, according to the first state value DT1 and the second state value DT2.

In this embodiment, the controller 211 may be a power delivery (PD) controller, yet the disclosure is not limited thereto. The controller 212 may be a Thunderbolt controller.

The processor 120 generates the third state value DT3 according to the connection state of the data port PD. When the data port PD does not receive the audiovisual source, the third state value DT3 is equal to the first value. When the data port PD receives the audiovisual source, the third state value DT3 is equal to the second value. For example, in this embodiment, the data port PD is a USB Type-C data transfer only port. The data port PD has a VBUS pin. The processor 120 determines whether the data port PD receives the audiovisual source through, for example, the VBUS pin of the data port PD, and generates the third state value DT3 accordingly. For example, the processor 120 determines whether the data port PD receives the audiovisual source according to a voltage level of the VBUS pin of the data port PD.

In this embodiment, the controller 211 communicates with the processor 120 through, for example, the inter-integrated circuit (I2C) protocol. When at least one of the first state value DT1 or the second state value DT2 is changed, the controller 211 will notify the processor 120 to read the first state value DT1 and the second state value DT2.

The processor 120 reads the register RG1 and the register RG2 to acquire the first state value DT1 and the second state value DT2. The processor 120 makes a determination on the first state value DT1, the second state value DT2, and the third state value DT3. In this embodiment, when all of the first state value DT1, the second state value DT2, and the third state value DT3 are equal to the first value, none of the input port PI, the output port PO, and the data port PD of the display device 200 is connected to the audiovisual source. Hence, the processor 120 determines that the display device 200 is not connected to the audiovisual source.

Figure 4:
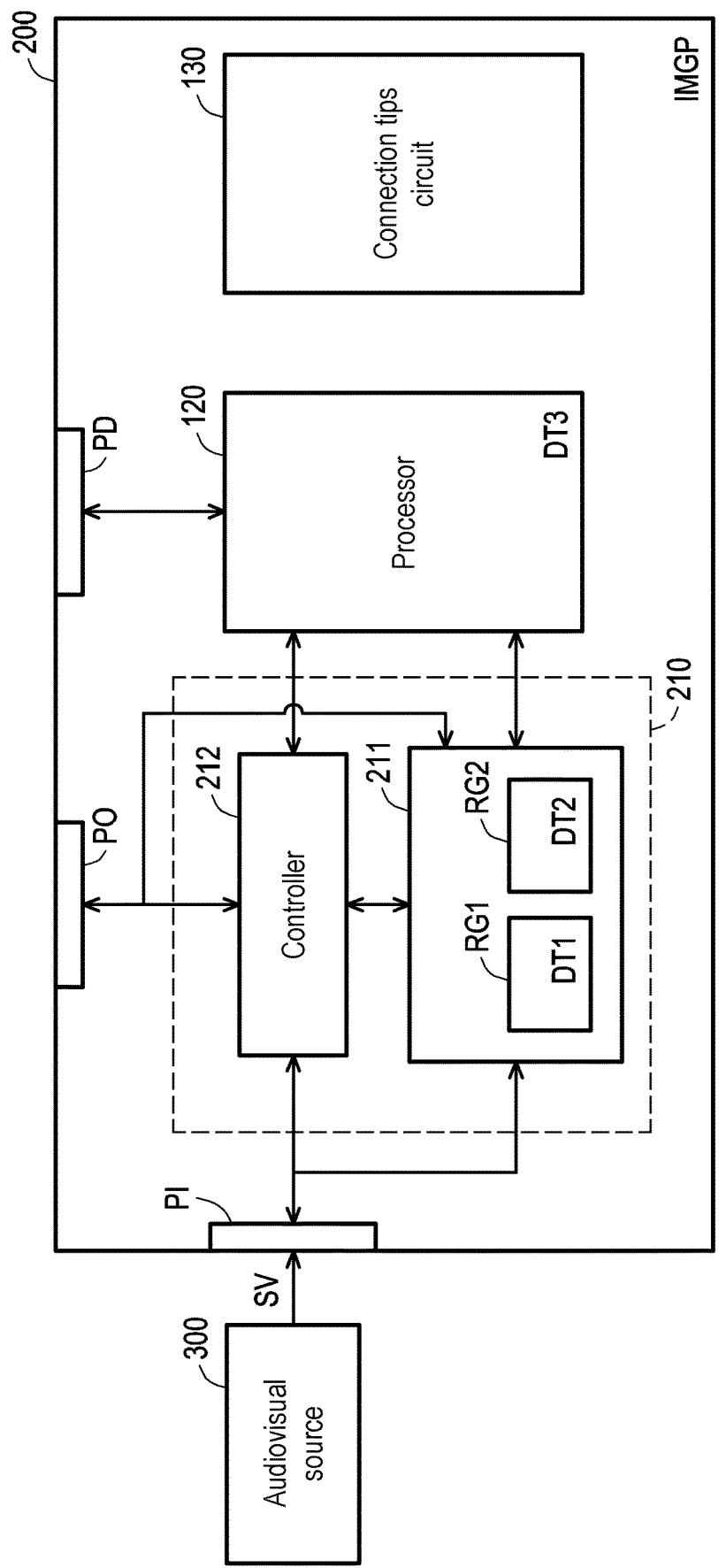
FIG. 4 is a schematic view illustrating a connection according to one embodiment of the disclosure.

Referring to FIG. 4, FIG. 4 is a schematic view illustrating a connection according to one embodiment of the disclosure. FIG. 4 illustrates an example of correct connection. In this embodiment, the input port PI of the display device 200 is connected to the audiovisual source 300. The controller 211 changes the first state value DT1 stored in the register RG1 into the second value (for example, "1"), lets the second state value DT2 stored in the register RG2 remain the first value (for example, "0"), and notifies the processor 120. The processor 120 reads the first state value DT1 and the second state value DT2. When the first state value DT1 is equal to the second value and the second state value DT2 is equal to the first value, the processor 120 recognizes that the input port PI is connected to the audiovisual source 300, and determines that the connection between the display device 200 and the audiovisual source 300 is correct. The display device 200 correctly receives the audiovisual signal SV through the input port PI. The processor 120 does not provide the connection tips signal SST.

Figure 5:
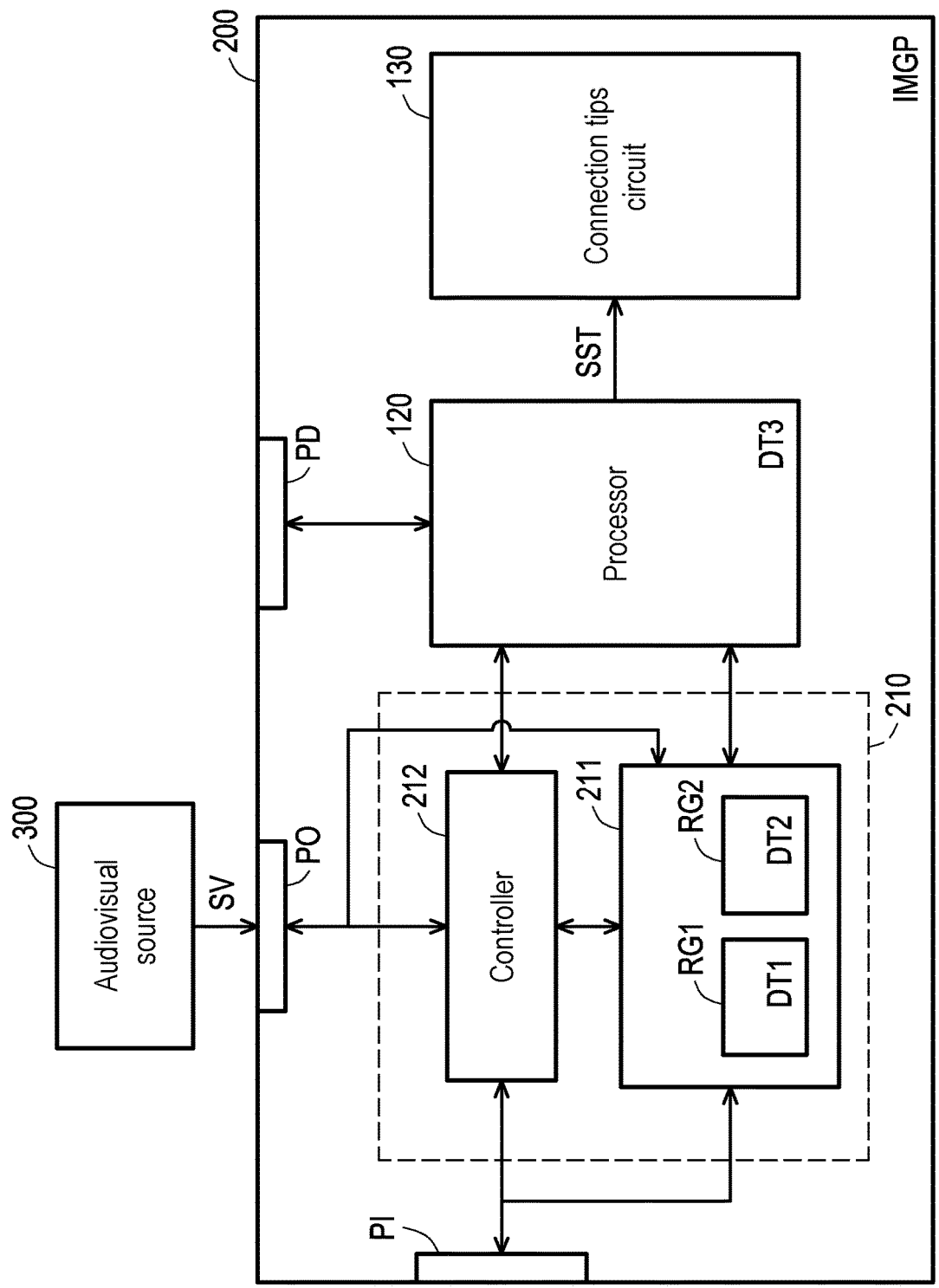
FIG. 5 is a schematic view illustrating a connection according to one embodiment of the disclosure.

Referring to FIG. 5, FIG. 5 is a schematic view illustrating a connection according to one embodiment of the disclosure. FIG. 5 illustrates an example of incorrect connection. In this embodiment, the output port PO of the display device 200 is connected to the audiovisual source 300. The controller 211 lets the first state value DT1 stored in the register RG1 remain the first value (for example, "0"), changes the second state value DT2 stored in the register RG2 into the second value (for example, "1"), and notifies the processor 120. The processor 120 reads the first state value DT1 and the second state value DT2. When the first state value DT1 is equal to the first value and the second state value DT2 is equal to the second value, the processor 120 recognizes that the output port PO is connected to the audiovisual source 300, and determines that the connection between the display device 200 and the audiovisual source 300 is incorrect. The processor 120 provides the connection tips signal SST.

Figure 6:
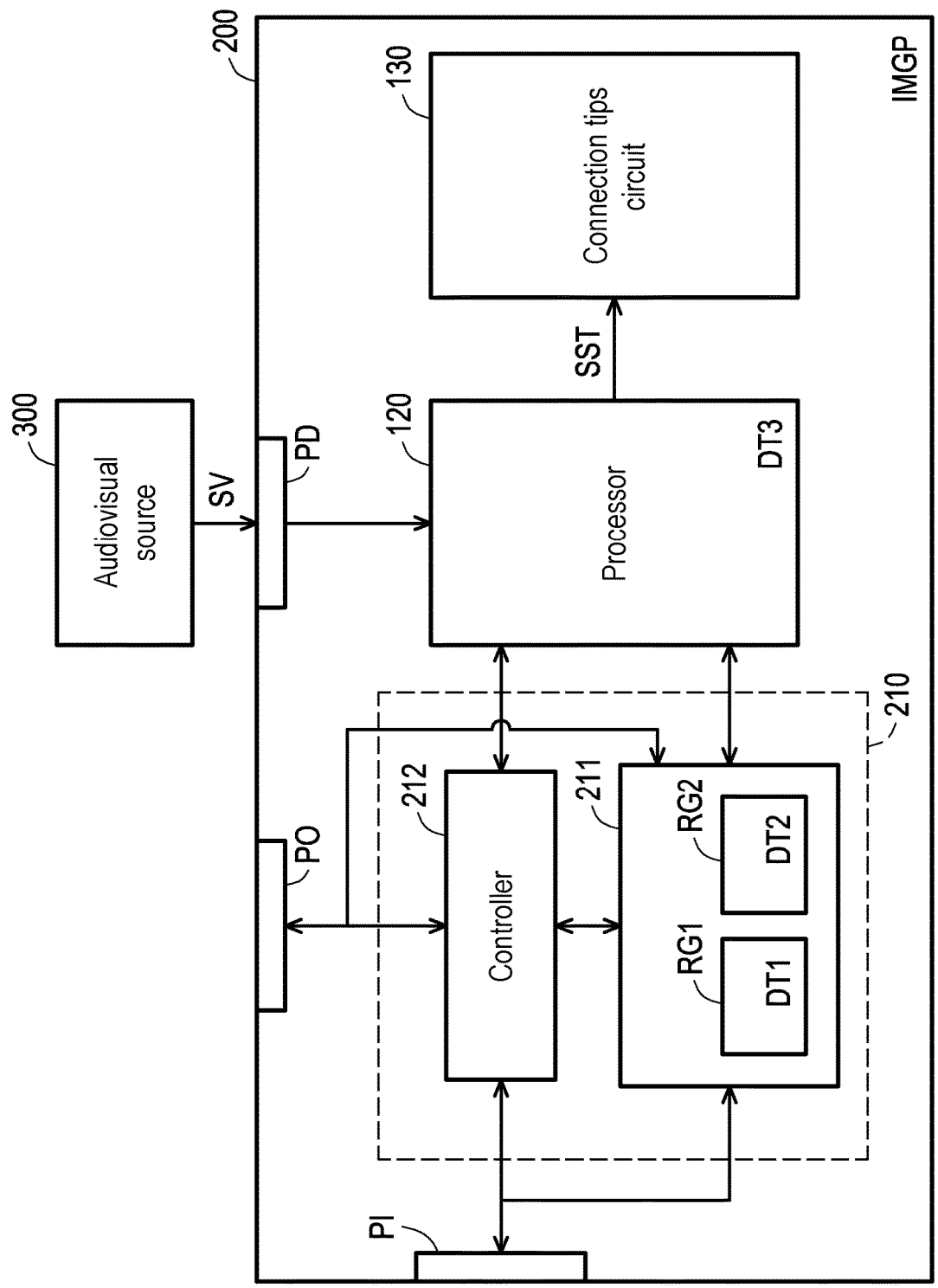
FIG. 6 is a schematic view illustrating a connection according to one embodiment of the disclosure.

Referring to FIG. 6, FIG. 6 is a schematic view illustrating a connection according to one embodiment of the disclosure. FIG. 6 illustrates an example of incorrect connection. In this embodiment, the display device 200 is connected to the audiovisual source 300 only through the data port PD. The controller 211 lets the first state value DT1 stored in the register RG1 remain the first value (for example, "0") and lets the second state value DT2 stored in the register RG2 remain the first value. However, the processor 120 recognizes that the third state value DT3 is equal to the second value (for example, "1"). When the first state value DT1 is equal to the first value and the third state value DT3 is equal to the second value, the processor 120 recognizes that the display device 200 is connected to the audiovisual source 300 only through the data port PD. Hence, the processor 120 determines that the connection between the display device 200 and the audiovisual source 300 is incorrect. The processor 120 provides the connection tips signal SST.

Figure 7:
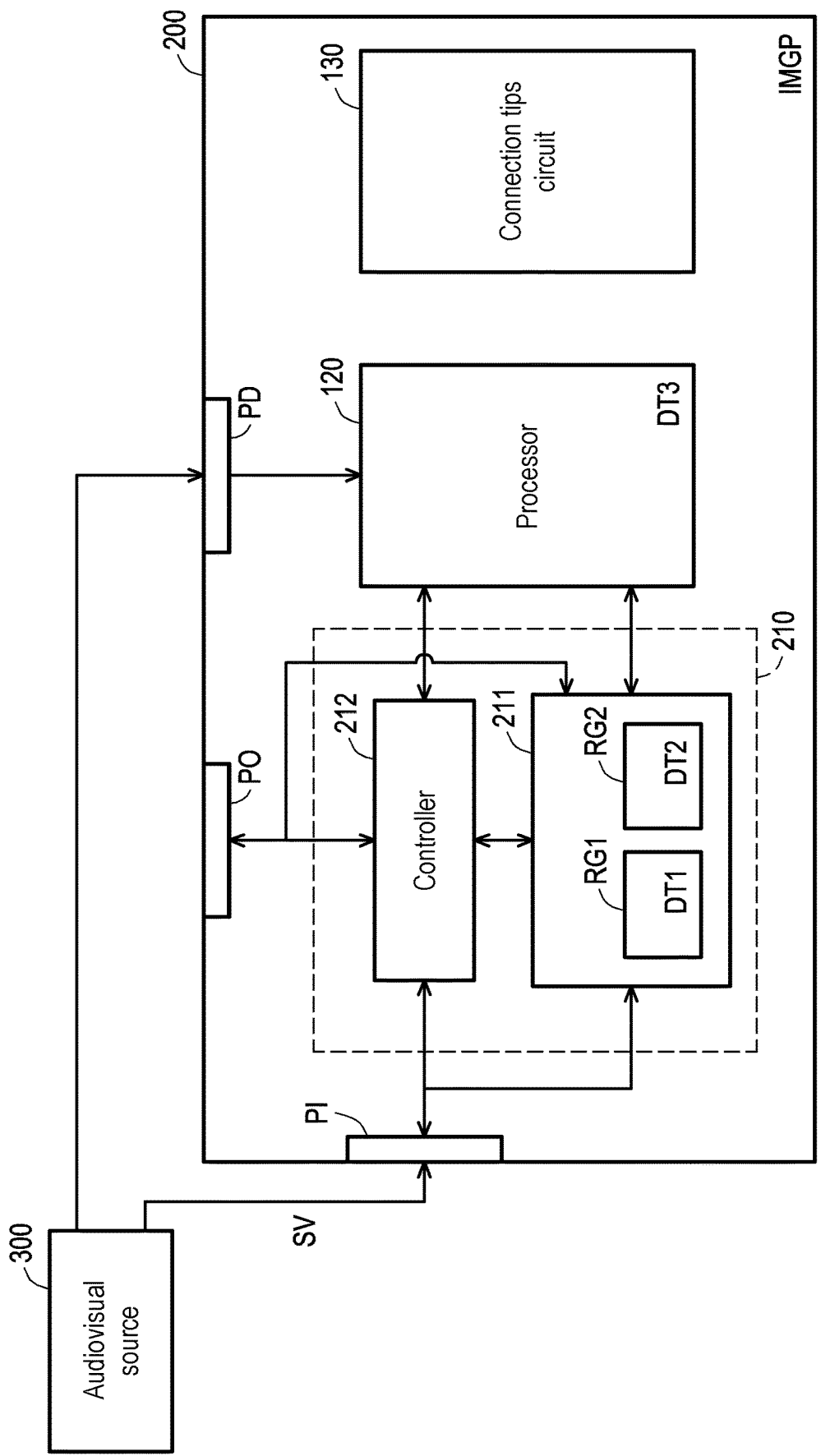
FIG. 7 is a schematic view illustrating a connection according to one embodiment of the disclosure.

Referring to FIG. 7, FIG. 7 is a schematic view illustrating a connection according to one embodiment of the disclosure. FIG. 7 illustrates an example of correct connection. In this embodiment, the display device 200 is connected to the audiovisual source 300 through the input port PI and the data port PD. The controller 211 changes the first state value DT1 stored in the register RG1 into the second value (for example, "1"), lets the second state value DT2 stored in the register RG2 remain the first value (for example, "0"), and notifies the processor 120. The processor 120 reads the first state value DT1 and the second state value DT2, and recognizes that the third state value DT3 is changed into the second value. When both the first state value DT1 and the third state value are equal to the second value, the processor 120 recognizes that the display device 200 is connected to the audiovisual source 300 through the input port PI and the data port PD, and determines that the connection between the display device 200 and the audiovisual source 300 is correct. The processor 120 does not provide the connection tips signal SST.

Figure 8:
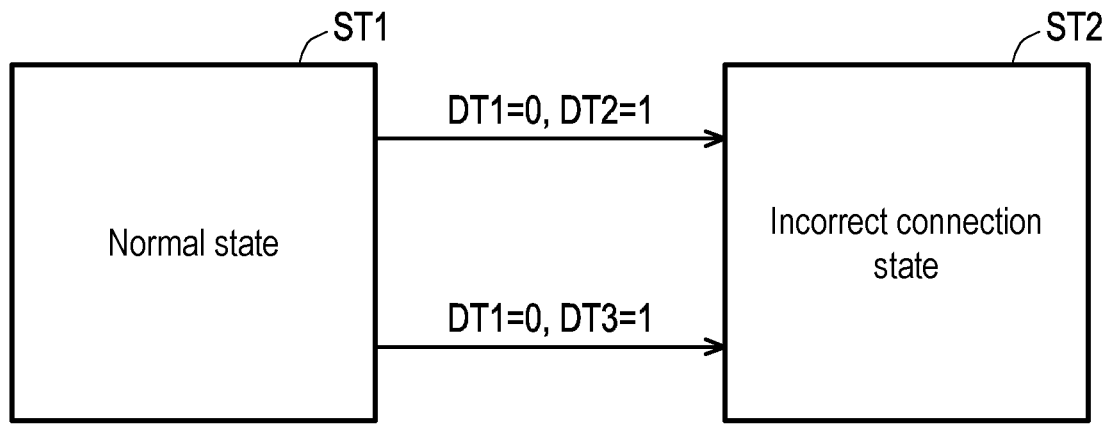
FIG. 8 is a state diagram according to one embodiment of the disclosure.

Referring to FIG. 1 and FIG. 8 together, FIG. 8 is a state diagram according to one embodiment of the disclosure. FIG. 8 illustrates a normal state ST1 and an incorrect connection state ST2 of the display device 100. In this embodiment, the processor 120 determines state switching between the normal state ST1 and the incorrect connection state ST2 according to the first state value DT1, the second state value DT2, and the third state value DT3. In the normal state ST1, when the first state value DT1 is equal to the first value (that is, "0") and the second state value DT2 is equal to the second value (that is, "1"), the processor 120 determines that the display device 100 enters the incorrect connection state ST2 from the normal state ST1.

In the normal state ST1, when the first state value DT1 is equal to the first value and the third state value DT3 is equal to the second value, the processor 120 determines that the display device 100 enters the incorrect connection state ST2 from the normal state ST1.

In the normal state ST1, when all of the first state value DT1, the second state value DT2, and the third state value DT3 are equal to the first value, the processor 120 determines that the display device 100 is not connected to the audiovisual source 300. The fact that the display device 100 is not connected to the audiovisual source 300 falls within the normal state ST1. Hence, the processor 120 determines that the display device 100 remains in the normal state ST1.

In this embodiment, in the incorrect connection state ST2, the display device 100 provides the connection tips signal. In step S130, the connection tips circuit 130 controls the display device 100 to display the connection tips image IMGP in response to the connection tips signal SST.

Figure 9:
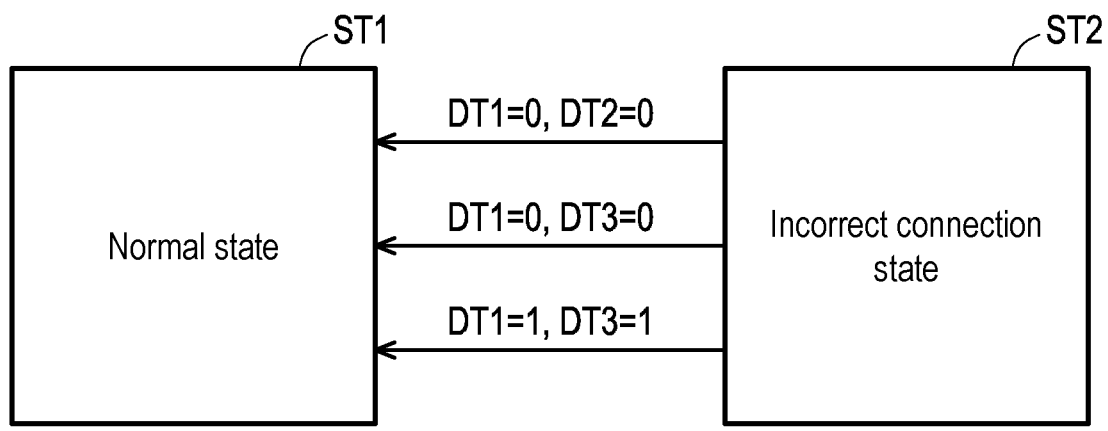
FIG. 9 is a state diagram according to one embodiment of the disclosure.

Referring to FIG. 1 and FIG. 9 together, FIG. 9 is a state diagram according to one embodiment of the disclosure. FIG. 9 illustrates the normal state ST1 and the incorrect connection state ST2 of the display device 100. In this embodiment, in the incorrect connection state ST2, when both the first state value DT1 and the second state value DT2 are equal to the first value (that is, "0"), the processor 120 determines that the display device 100 enters the normal state ST1 from the incorrect connection state ST2.

In the incorrect connection state ST2, when both the first state value DT1 and the third state value DT3 are equal to the first value, the processor 120 determines that the display device 100 enters the normal state ST1 from the incorrect connection state ST2.

In the incorrect connection state ST2, when both the first state value DT1 and the third state value DT3 are equal to the second value (that is, "1"), it means that the connection between the display device 100 and the audiovisual source 300 is correct. The processor 120 determines that the display device 100 enters the normal state ST1 from the incorrect connection state ST2.

It should be understood that determining the state switching between the normal state ST1 and the incorrect connection state ST2 also applies to the display device 200 illustrated in FIG. 3.

Figure 10:
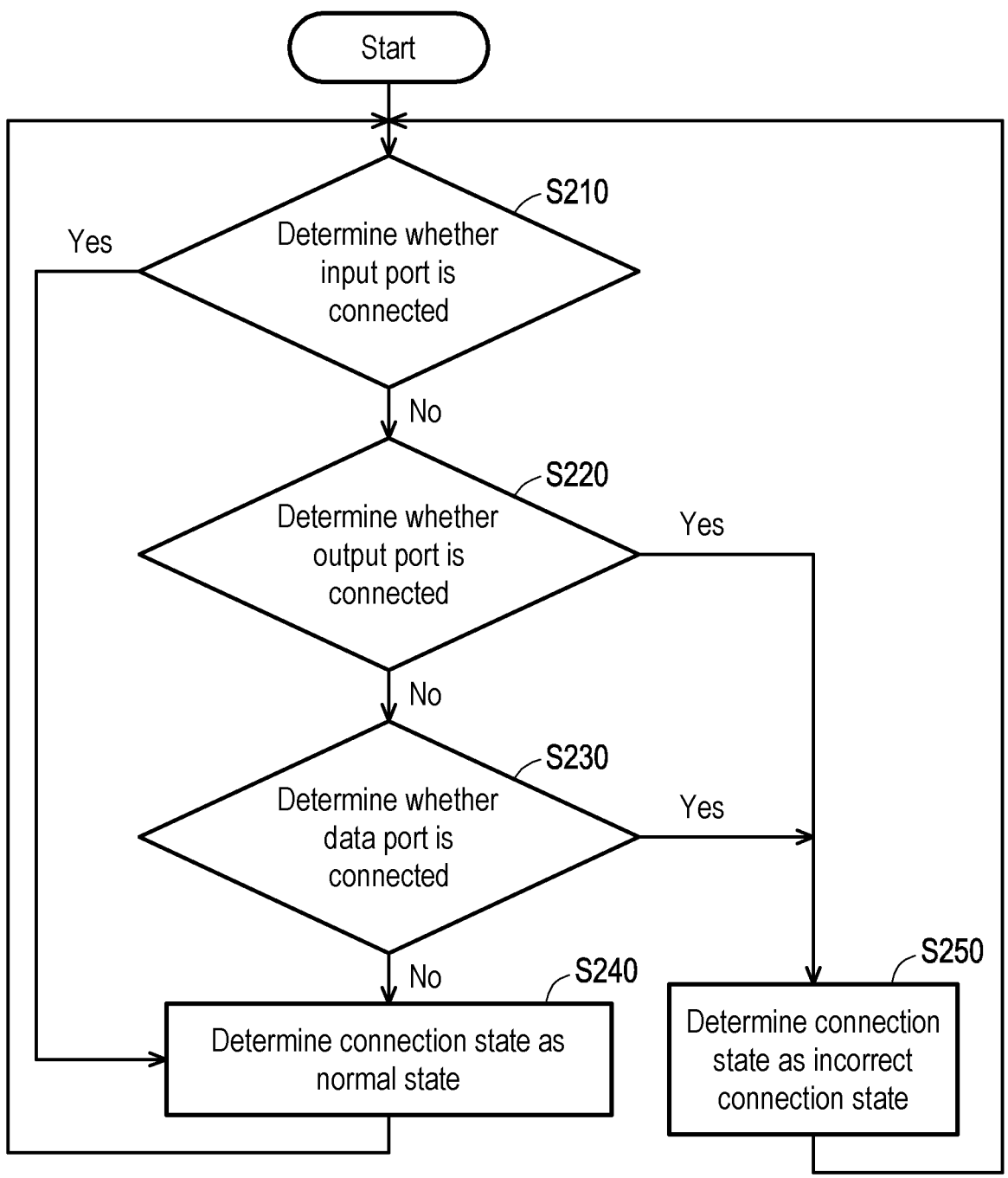
FIG. 10 is a schematic view illustrating an operation method according to one embodiment of the disclosure.

Referring to FIG. 1, FIG. 8, FIG. 9, and FIG. 10 together, FIG. 10 is a schematic view illustrating an operation method according to one embodiment of the disclosure. An operation method S200 is adapted for the display device 100. In this embodiment, the operation method S200 includes steps S210 to S250. The processor 120 determines the connection state of the input port PI, the output port PO, and the data port PD in order based on the operation method S200. The operation method S200 is started from the normal state ST1. In step S210, the processor 120 determines whether the input port PI is connected. In this embodiment, in step S210, the processor 120 determines whether the input port PI is connected according to the first state value DT1. When the first state value DT1 is equal to the second value (for example, "1"), the processor 120 determines that the input port PI is connected to the audiovisual source 300. The connection between the display device 100 and the audiovisual source 300 is correct. Hence, in step S240, the processor 120 determines that a current connection state is the normal state ST1.

On the other hand, in step S210, when the first state value DT1 is equal to the first value (for example, "0"), the processor 120 determines that the input port PI is not connected to the audiovisual source 300. In step S220, the processor 120 determines whether the output port PO is connected.

In step S220, the processor 120 determines whether the input port PI is connected according to the second state value DT2. In step S220, when the second state value DT2 is equal to the second value (for example, "1"), it means that the input port PI is not connected to the audiovisual source 300, and the output port PO is connected to the audiovisual source 300. Hence, in step S250, the processor 120 determines that the current connection state is the incorrect connection state ST2. Next, the process returns to the operation of step S210 in the operation method S200.

On the other hand, in step S220, when the first state value DT2 is equal to the first value (for example, "0"), the processor 120 determines that neither the input port PI nor the output port PO is connected to the audiovisual source 300. In step S230, the processor 120 determines whether the data port PD is connected.

In step S230, the processor 120 determines whether the data port PD is connected according to the third state value DT3. In step S230, when the third state value DT3 is equal to the second value (for example, "1"), it means that neither the input port PI nor the output port PO is connected to the audiovisual source 300 and the data port PD is connected to the audiovisual source 300. Hence, in step S250, the processor 120 determines that the current connection state is the incorrect connection state ST2. Next, the process returns to the operation of step S210 in the operation method S200.

On the other hand, in step S230, when the third state value DT3 is equal to the first value (for example, "0"), it means that none of the input port PI, the output port PO, and the data port PD is connected to the audiovisual source 300. Hence, in step S240, the processor 120 determines that the current state is the normal state ST1. Next, the process returns to the operation of step S210 in the operation method S200.

Based on the above, the determination of the normal state ST1 and the incorrect connection state ST2 can be summarized in Table 1 and Table 2, respectively. The processor 120 can determine the current connection state according to Table 1 and Table 2.

TABLE 1

|     | ST1 |   | ST2 |
| --- | --- | --- | --- |
| DT1 | 0 | 1 | 0 |
| DT2 | 0 | 0 | 1 |

TABLE 2

|     | ST1 |   | ST2 |
| --- | --- | --- | --- |
| DT1 | 0 | 1 | 0 |
| DT3 | 0 | 0 or 1 | 1 |

Figure 11:
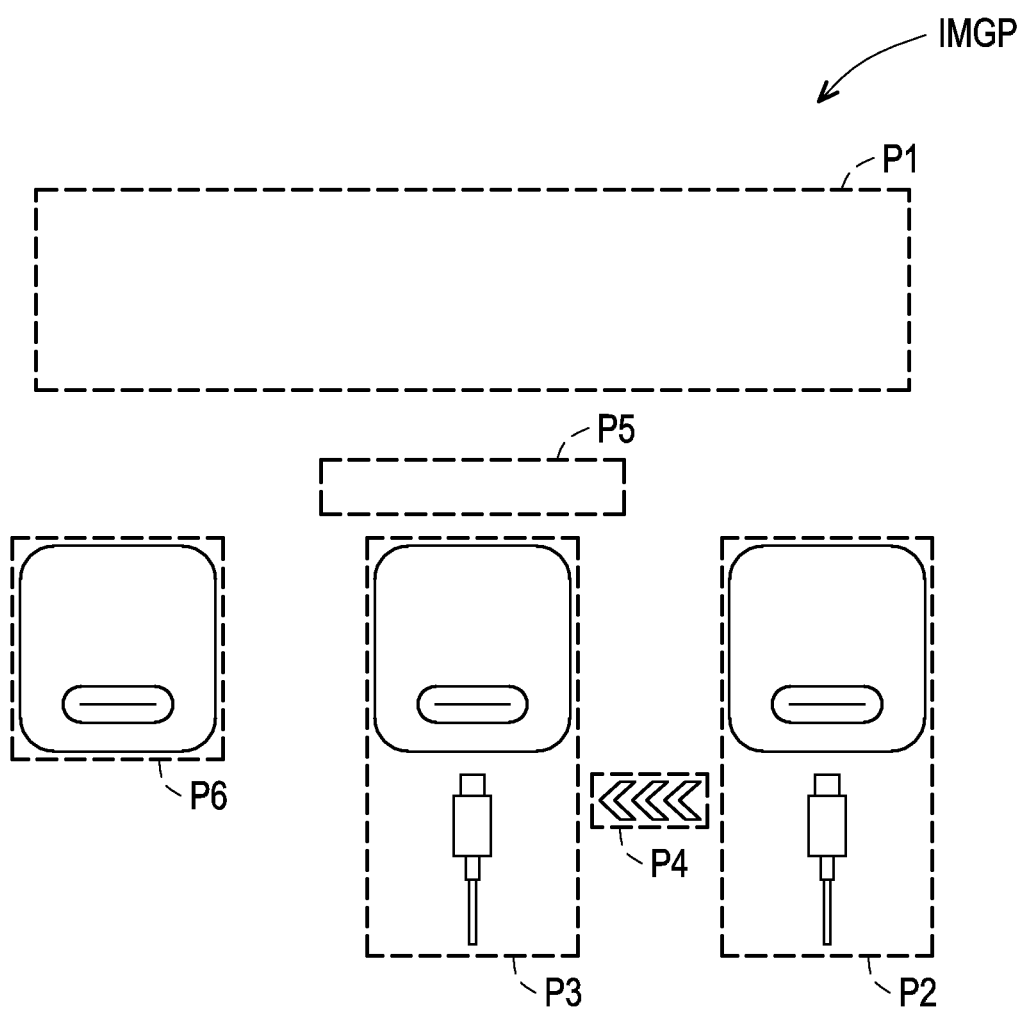
FIG. 11 is a schematic view illustrating a connection tips image according to one embodiment of the disclosure.

Referring to FIG. 1 and FIG. 11 together, FIG. 11 is a schematic view of a connection tips image according to one embodiment of the disclosure. In this embodiment, when the input port PI is not connected to the audiovisual source 300 and the output port PO is connected to the audiovisual source 300, the processor 120 determines that the connection is incorrect. Thus, the processor 120 provides the corresponding connection tips signal SST. The connection tips circuit 130 receives the connection tips signal SST. The connection tips circuit 130 controls the display device 100 according to the connection tips signal SST. The display device 100 displays the connection tips image IMGP to guide the user in performing a correct connection.

In this embodiment, the connection tips image IMGP includes tips portions P1 to P6. The tips portion P1 displays a description of incorrect connection in which the audiovisual source 300 is connected to the output port PO. For example, the tips portion P1 displays text concerning the incorrect connection in which the audiovisual source 300 is connected to the output port PO.

The tips portion P2 displays incorrect connection in which the current audiovisual source 300 is connected to the output port PO. For example, the tips portion P2 displays through a graphic the incorrect connection in which the current audiovisual source 300 is connected to the output port PO. In another example, the tips portion P1 displays through text the incorrect connection in which the current audiovisual source 300 is connected to the output port PO.

The tips portion P3 displays a correct connection method between the display device 100 and the audiovisual source 300. For example, the tips portion P3 displays through a graphic a correct connection method between the input port PI and the audiovisual source 300. In another example, the tips portion P3 displays through text a correct connection method between the input port PI and the audiovisual source 300. The tips portion P4 displays an icon of switching direction. The switching direction in the tips portion P4 points to the tips portion P3 from the tips portion P2. Thus, the user is intuitively informed that the incorrect connection in the tips portion P2 needs to be changed to the correct connection in the tips portion P3. The tips portion P6 displays the data port PD.

The tips portion P5 displays information on relative positions of the input port PI, the output port PO, and the data port PD. For example, the tips portion P5 displays information on the "front" of the display device 100. On the front side of the display device 100, the output port PO is located on the right of the input port PI, and the input port PI is located on the right of the data port PD. Hence, the user is able to clearly know the relative positions of the input port PI, the output port PO, and the data port PD according to the connection tips image IMGP.

In light of the foregoing, in the display device, a result of the connection between the display device and the audiovisual source is determined according to the first state value, the second state value, and the third state value, and the connection tips image is displayed accordingly. Hence, when a connection error occurs, the display device provides the connection tips image to guide the user in performing a correct connection.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display device, comprising:
   a hardware input port;
   a hardware output port;
   a hardware data port;
   a detection circuit, coupled to the hardware input port and the hardware output port, configured to generate a first state value according to a connection state of the hardware input port and to generate a second state value according to a connection state of the hardware output port;
   a processor, coupled to the hardware data port and the detection circuit, configured to generate a third state value according to a connection state of the hardware data port, to read the first state value and the second state value, and to determine a connection between the display device and an audiovisual source and provide a connection tips signal according to the first state value, the second state value, and the third value; and
   a connection tips circuit, coupled to the processor, configured to control the display device to display a connection tips image in response to the connection tips signal,
   wherein the first state value, the second state value and the third state value are logical values,
   wherein when the first state value is different from one of the second state value and the third state value, the processor determines that the display device enters an incorrect connection state from a normal state.

2. The display device according to claim 1, wherein:
   the hardware input port and the hardware output port are each a USB Type-C audiovisual port, and
   the hardware data port is a USB Type-C data transfer only port.

3. The display device according to claim 1, wherein the processor determines whether the hardware data port receives the audiovisual source through a VBUS pin of the hardware data port and generates the third state value accordingly.

4. The display device according to claim 1, wherein:
   the processor determines whether the connection between the display device and the audiovisual source is incorrect according to the first state value, the second state value, and the third state value, and
   in response to the connection between the display device and the audiovisual source being determined to be incorrect, the processor provides the connection tips signal.

5. The display device according to claim 1, wherein:
   in response to the hardware input port not being connected to the audiovisual source, the first state value is equal to a first value;
   in response to the hardware input port receiving the audiovisual source, the first state value is equal to a second value;
   in response to the hardware output port not receiving the audiovisual source, the second state value is equal to the first value;
   in response to the hardware output port receiving the audiovisual source, the second state value is equal to the second value;
   in response to the hardware data port not receiving the audiovisual source, the third state value is equal to the first value; and
   in response to the hardware data port receiving the audiovisual source, the third state value is equal to the second value.

6. The display device according to claim 5, wherein in response to the first state value being equal to the first value and the second state value being equal to the second value, the processor determines that the connection between the display device and the audiovisual source is incorrect.

7. The display device according to claim 5, wherein in response to the first state value being equal to the first value and the third state value being equal to the second value, the processor determines that the connection between the display device and the audiovisual source is incorrect.

8. The display device according to claim 5, wherein in response to the first state value being equal to the second value, the processor determines that the connection between the display device and the audiovisual source is correct.

9. The display device according to claim 5, wherein in response to the first state value being equal to the second value and the third state value being equal to the second value, the processor determines that the connection between the display device and the audiovisual source is correct.

10. The display device according to claim 1, wherein the detection circuit comprises:
   a first controller, coupled to the hardware input port, the hardware output port, and the processor, configured to generate the first state value according to the connection state of the hardware input port and to generate the second state value according to the connection state of the hardware output port; and
   a second controller, coupled to the hardware input port, the hardware output port, the first controller, and the processor, configured to determine an audiovisual signal transmission direction of the audiovisual source according to the first state value and the second state value.

11. The display device according to claim 10, wherein the first controller comprises:
   a first register, configured to store the first state value; and
   a second register, configured to store the second state value.

12. An operation method for a display device, the display device comprising a hardware input port, a hardware output port, a hardware data port, and a detection circuit, wherein the operation method comprises:
   generating a first state value according to a connection state of the hardware input port and generating a second state value according to a connection state of the hardware output port by the detection circuit;
   determining a connection between the display device and an audiovisual source and providing a connection tips signal according to the first state value, the second state value, and a third state value that corresponds to a connection state of the hardware data port; and
   controlling the display device to display a connection tips image in response to the connection tips signal,
   wherein the first state value, the second state value and the third state value are logical values,
   wherein when the first state value is different from one of the second state value and the third state value, determining that the display device enters an incorrect connection state from a normal state by a processor.

13. The operation method according to claim 12, wherein the hardware data port is a USB Type-C data transfer only port, and the operation method further comprises:
   determining whether the hardware data port receives the audiovisual source through a VBUS pin of the hardware data port and generating the third state value accordingly.

14. The operation method according to claim 12, wherein determining the connection between the display device and the audiovisual source and providing the connection tips signal according to the first state value, the second state value, and the third state value that corresponds to the connection state of the hardware data port comprises:
   determining whether the connection between the display device and the audiovisual source is incorrect according to the first state value, the second state value, and the third state value; and
   providing the connection tips signal in response to the connection between the display device and the audiovisual source being determined to be incorrect.

15. The operation method according to claim 12, wherein:
   in response to the hardware input port not being connected to the audiovisual source, the first state value is equal to a first value;
   in response to the hardware input port receiving the audiovisual source, the first state value is equal to a second value;
   in response to the hardware output port not receiving the audiovisual source, the second state value is equal to the first value;
   in response to the hardware output port receiving the audiovisual source, the second state value is equal to the second value;
   in response to the hardware data port not receiving the audiovisual source, the third state value is equal to the first value; and
   in response to the hardware data port receiving the audiovisual source, the third state value is equal to the second value.

16. The operation method according to claim 15, wherein determining the connection between the display device and the audiovisual source and providing the connection tips signal according to the first state value, the second state value, and the third state value that corresponds to the connection state of the hardware data port comprises:
   in response to the first state value being equal to the first value and the second state value being equal to the second value, determining that the connection between the display device and the audiovisual source is incorrect.

17. The operation method according to claim 15, wherein determining the connection between the display device and the audiovisual source and providing the connection tips signal according to the first state value, the second state value, and the third state value that corresponds to the connection state of the hardware data port comprises:
   in response to the first state value being equal to the first value and the third state value being equal to the second value, determining that the connection between the display device and the audiovisual source is incorrect.

18. The operation method according to claim 15, wherein determining the connection between the display device and the audiovisual source and providing the connection tips signal according to the first state value, the second state value, and the third state value that corresponds to the connection state of the hardware data port comprises:
   in response to the first state value being equal to the second value, determining that the connection between the display device and the audiovisual source is correct.

19. The operation method according to claim 15, wherein determining the connection between the display device and the audiovisual source and providing the connection tips signal according to the first state value, the second state value, and the third state value that corresponds to the connection state of the hardware data port comprises:
   in response to the first state value being equal to the second value and the third state value being equal to the second value, determining that the connection between the display device and the audiovisual source is correct.

* * * * *